Aug. 15, 1961 R. J. HOLTON 2,995,789
FASTENING DEVICE
Filed July 30, 1959
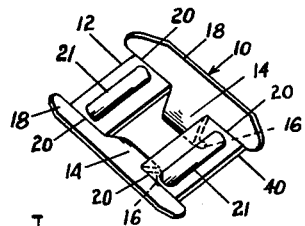
Fig. 1
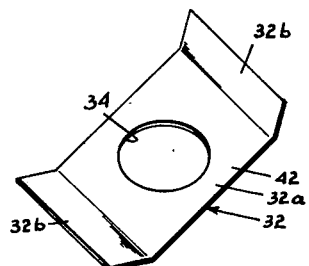
Fig. 4
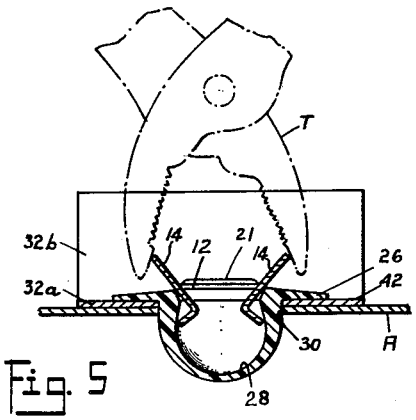
Fig. 5
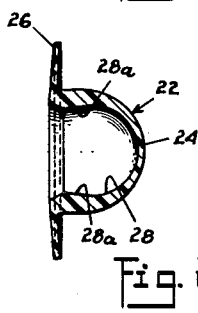
Fig. 2
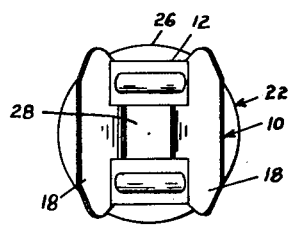
Fig. 3
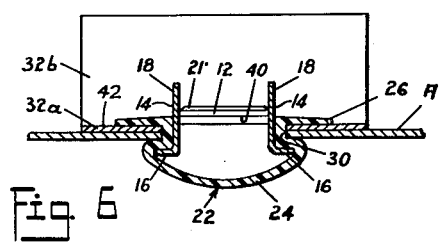
Fig. 6
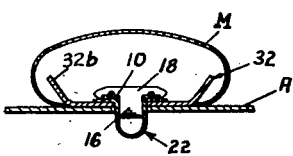
Fig. 8
Fig. 7
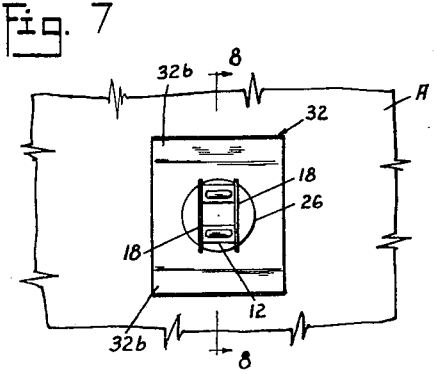
INVENTOR.
ROBERT J. HOLTON
BY
Teare, Kramer, Sturges & Fetzer
ATTORNEYS United States Patent Office 2,995,789
Patented Aug. 15, 1961

1

2,995,789
FASTENING DEVICE
Robert J. Holton, Cleveland, Ohio, assignor to Tinnerman Products, Inc., Cleveland, Ohio, a corporation of Ohio
Filed July 30, 1959, Ser. No. 830,529
6 Claims. (Cl. 24—73)

This invention relates to clip or fastener assemblies for mounting molding, trim-strips and similar objects on a supporting part, and more particularly relates to improvements in clip or fastener assemblies of the latter type which are adapted to be positively secured in a work opening in a supporting part by an operation taking place entirely from the outer accessible side of the supporting part, and which may embody a sealing element to effectively seal the work opening against the entry of water, dust, foreign matter and the like.

The form of clip or fastener proper for the fastener assembly is of the general character which comprises a sheet metal body defining a head or base carrying a pair of cooperating movable shank elements that are receivable in a work opening from one side thereof and secured in fastening position therein by an operation providing for expansion of the shank elements into interlocking relation with marginal portions of the work opening. The fastening assembly is of the type wherein a detachable sealing plug element may be readily and quickly assembled in detachable interlocking relationship with the clip proper, to provide a combined securing and sealing arrangement readily assembled in secured and positive sealing relation in the work opening of the supporting part. A clip proper of the type adaptable for use with the instant invention is that shown in the United States patent of Robert J. Holton, No. 2,875,487 issued March 3, 1959. A sealing element of the aforementioned type which is suitable for the instant arrangement is that shown in United States Patent No. 2,924,864, of Robert J. Holton, issued February 16, 1960.

In the aforementioned Patent 2,875,487 there is disclosed a fastener of highly simplified construction comprising a relatively small inexpensive piece of sheet metal providing the base or body of the clip or fastener and a pair of cooperating arms defining elements projecting from both the inner and outer surfaces of the base, with the outer elements serving the dual purpose of means for expanding the inner elements to anchored position in a work opening in a supporting part and means for mounting a molding or trim-strip or the like on said supporting part. However, different sizes or widths or trim-strip or molding require different sizes of the aforementioned outer elements of the arms of the clip proper and thus different sizes of clips, for so securing various sizes of trim-strip to a supporting part.

Accordingly, it is an object of this invention to provide a fastening assembly for securing molding and the like to a supporting part wherein an inexpensive auxiliary or secondary sheet metal molding attaching member is provided which is assembled with a clip proper of the aforementioned type and preferably with a sealing element of the general type of above-mentioned Patent 2,924,864, and which secondary member performs the function of holding the trim-strip to the supporting part, thereby providing an economical assembly for holding trim-strip without the necessity of stocking and utilizing a large number of sizes of the clip proper for attaching various sizes of trim-strip to a supporting part.

Broadly the present invention provides a fastening and sealing assembly comprising the aforementioned bendable arm type clip on which may be detachably assembled a sealing element of the aforementioned type, together with an inexpensive auxiliary trim-strip securing member comprising a base portion and projecting flange portions for actually holding the trim-strip on the supporting part, and wherein the base portion of the auxiliary member has an opening therethrough through which the bendable shank portions of the clip proper and the head portion of the sealing element project, after which the shank portions of the clip proper may be bent or actuated in the conventional manner to secure the secondary clip member, the sealing element, and the clip proper element over a work opening in the supporting part, to thereby not only seal the work opening against the passage therethrough of foreign matter, but also to provide an inexpensive arrangement for attaching various sizes of trim-strip or molding to the supporting part, while permitting the use of a single size of clip proper in the fastening assemblies.

Other features and advantages of the invention will be apparent from the following description taken in conjunction with the accompanying drawings wherein:

FIG. 1 is a perspective view of a clip or fastener of the aforementioned bendable arm type adapted for use in the fastening and sealing assembly of the instant invention, and as specified above is of a type known in the art.

FIG. 2 is a vertical cross-sectional view of a sealing element which is adapted for use in the fastening and sealing assembly of the invention, and as aforementioned is of a type known in the art.

FIG. 3 is an outer side top plan view of the clip member of FIG. 1 and the sealing element of FIG. 2 in assembled condition for use in the fastening and sealing assembly of the invention.

FIG. 4 is a perspective view of the auxiliary or secondary sheet-metal clip member which actually performs the operation of holding the molding or trim-strip to the supporting part, and which is adapted for use in the fastening assembly of the invention.

FIG. 5 is a sectional view showing the clip proper and sealing element assembly of FIG. 3 assembled with the secondary clip member of FIG. 4 to provide the fastening assembly of the invention, and as initially assembled in the work opening in a supporting part or panel preparatory to securing the same in and over said work opening.

FIG. 6 is a view generally similar to FIG. 5 but showing the clip proper of FIG. 1 as actuated or bent to secure the assembly in sealing relation in the work opening.

FIG. 7 is a reduced size top plan view of the secured assembly of FIG. 6.

FIG. 8 is a sectional view taken substantially along line 8—8 of FIG. 7 looking in the direction of the arrows, and illustrating a trim-strip or molding held in attached secured relation by the auxiliary or secondary clip member of FIG. 4 as disposed in a complete fastener assembly and on the support panel.

Referring again to the drawings, there is shown in FIG. 1 a bendable arm clip 10 of the type adapted for use in the instant fastening and sealing assembly, and as aforementioned is of a type known in the art, for instance from the aforesaid Patent No. 2,875,487. The clip or fastener 10 is an inexpensive article of manufacture which is readily constructed from any suitable malleable sheet metal, such as cold rolled steel or malleable steel metal. Such malleable type metal possesses the characteristics that it may be permanently deformed upon predetermined application of force, as distinguished from a purely spring-type metal which when bent will substantially return to its original position upon removal of the bending or distorting force. The clips may be formed from blanks of various outlines, but from a quantity production standpoint are most advantageously provided from a comparatively small, generally rectangular blank, such as indicated in FIG. 1, which is readily obtained from standard sheet metal strip stock with little loss or waste of material.

The sheet metal blank or body defines the base 12 of the clip which is provided with a partially severed area preferably in the approximate center thereof, forming a pair of bendable or movable arms 14, each comprising a tongue or shank portion 16 joined to a tab or head portion 18, the latter having a bendable or hinge connection to the base 12 along the bend lines 20. The base 12 may be provided with indented embossments 21 for rigidifying the base.

The separable or detachable sealing element or plug 22 of the fastener assembly may be of the type of the aforemention Patent 2,924,864, and comprises a generally hollow dome-shaped head portion 24 and a base in the form of a peripheral flange or brim portion 26 which extends generally radially outwardly from the head portion. The sealing element is made from some pliable, resilient-like material, such as rubber, and may be economically mass produced. The head portion 24 defines a cavity 28 which is adapted to receive the shank portions 16 of the clip 10 therein to mount the sealing element 22 in detachable assembled relation with the clip, and as illustrated in FIG. 3 of the drawings. The shank elements 16 of the clip may be disposed in interlocking relation with oblique interior abutment surfaces 28a to maintain the clip 10 and sealing element in interlocked relation, and as discussed in detail in the aforementioned Patent 2,924,864.

The supporting part or panel A is usually in the form of a plate or panel or the like, such as for instance the exterior side panels of an automotive vehicle, and is provided with a series of spaced openings 30 therein for the required number of clip assemblies to be secured thereto along the path which the molding M (FIG. 8) is to extend when in mounted position. The panel A may be of any suitable metal, wood or fiber board material, and the openings 30 therein may be round, rectangular or of any other suitable outline, but usually are provided in the manner of ordinary circular holes which involve the least cost inasmuch as only the simplest and cheapest punching or drilling tools are required. Opening 30 is preferably of approximately the same size and configuration as the head portion 24 of sealing element 22 for receiving the latter therein in slight frictional retaining relation.

In accordance with the invention, an auxiliary or secondary sheet metal member 32 (FIG. 4) is provided for the fastener assembly, which member actually performs the function of holding the molding or trim-strip on the supporting panel A. Member 32 comprises a more or less planar base portion 32a and resilient flange portions 32b projecting outwardly therefrom from opposite sides thereof. Base portion 32a comprises an opening 34 therethrough, which in the embodiment of the invention illustrated has been shown as a circular opening, which is adapted to receive therethrough the head portion 24 of the sealing element 22 and the shank portions 16 of the clip proper 10 when in assembled relation therewith. Opening 34 is preferably of such size and such configuration that it receives the head portion 24 of the sealing element 22 and associated shank portions 16 of the clip 10 therein in relatively snug relation, to thereby frictionally retain the clip 10, sealing element 24 and secondary clip member 32 in assembled and readily handled relation.

The clip 32 is preferably constructed from relatively thin sheet metal, the thickness of which is selected according to service requirements and the predetermined size of the molding or trim-strip to be mounted or secured thereby. Such clip is most effective when provided of spring metal suitably tempered and otherwise treated to give the desired toughness and hardness. An inexpensive and highly satisfactory clip may be provided from cold rolled metal, such as cold rolled steel, which is untempered but of a spring metal nature, and capable of providing an effective and reliable trim-strip holding device in the fastener assembly described.

In mounting the securing and sealing assembly of the invention on the supporting part or panel A, a sealing plug or element 22 is preferably first assembled with the clip 10, by positioning a sealing element over the shank portions 16 of the arms 14 of the clip, and then forcing the sealing element downwardly into seating relationship with the rearward or underside 40 of the body or base 12 of the clip. During this movement the shank portions 16 are received into the cavity 28 of the sealing element to maintain the sealing element in mounted and substantially undeformed condition on the clip. Next, the head portion 24 of the sealing element 22 and associated shank portions 16 of the clip 10 are inserted through the opening 34 in the base 32a of the secondary securing member 32, and then the entire assembly is positioned over the work opening 30 in the supporting part or panel A and the head portion 24 of the sealing element and associated shank portions 16 of the clip proper 10 are moved through the work opening to substantially the position illustrated in FIG. 5 of the drawings. In this position, the tabs 18 of the clip proper are readily accessible from the upper or outer side of the panel, and upon actuation thereof, as by means of the tool T illustrated, the bendable arms 14 are bent around their hinge line connections 20 to the base 12, to thereby cause the shank portions 16 to pivot in a manner whereby the shank portions are forced outwardly with respect to one another and overlap the adjacent edges of the work opening 30 in the panel on the rearward or underside of the panel.

During such movement of the shank portions 16, the head portion 24 of the sealing element is deformed or stretched in the direction of movement of the shank portions, whereby portions of the defining wall of the head 24 of the sealing element are urged into overlapping relationship with marginal edge portions of the panel A around the work opening 30. As the free ends of the shank portions 16 of the arms 14 deform and urge sections of the head portion 24 into generally co-planar relationship with respect to the rearward or underside of panel A, the arms also draw the body 12 of the clip 10 towards and into engagement with the top side of the flange 26 of the sealing element, and thus compress the same against the top surface 42 of the base portion 32a of the secondary clip member 32, thereby urging the latter into generally flat abutting relation with the outer or top side of the supporting panel A. It will be seen therefore that a positive sealing of the work opening 30 in the supporting panel A occurs upon bending of the arm elements 14 to the general position illustrated in FIG. 6 of the drawings, to thereby provide a very effective seal against the entry of water, dust, etc. through the work opening. The tabs 18 of the clip proper 10 preferably extend lengthwise transverse to the lengthwise extension of flanges 32b of secondary clip member 32, as can be best seen from FIGS. 6, 7 and 8, to provide ready accessibility to the tabs by actuating tool T.

In mounting the molding M on the panel A, as many clip or fastener assemblies as are necessary are similarly secured in work openings prepared in such panel A and in generally aligned relation along the path in which the molding M is to extend in a completed assembly. The molding M, which is of a more or less resilient nature, well known in the art, is positioned over the secondary clip member 32 and is snapped into place and into interlocking relation with the resilient flanges 30b of the secondary clip member 32, and as illustrated in FIG. 8 of the drawings, to attach the molding M to the support panel A.

It will be seen that for various sizes or transverse widths of molding, various sizes of auxiliary or secondary clip members 32 may be readily provided, the latter being of an economical and readily manufactured configuration, to thereby provide an effective, yet economical fastening and sealing arrangement for the molding or trim-strip.

It will be seen that only one size of clip proper 10 may be utilized in fastening assemblies utilizing various sizes of secondary clips 32, the latter being a much more economical item as compared to the clip proper, thereby eliminating the necessity of stocking and using a great plurality of sizes of the clip proper 10 for use with various sizes of molding. It will also be understood that in those fastener environments where sealing of the work opening in the support panel is not necessary or desirable, the sealing element 22 could be eliminated from the fastener assembly, to provide an even more economical arrangement.

If it becomes desirable or necessary to replace or repair the supporting panel A or the molding trim-strip, as often occurs in the automotive environmental field, the molding M may be readily snapped out of interlocking relationship with the flanges 32b on the secondary clip member 32, thereby exposing the tabs 18 of the bendable arms 14 of the clip proper 10 for bending away from one another, whereby the shank portions 16 are moved inwardly towards one another and out of interlocking relationship with the inner or underside of the supporting panel. The securing and sealing clip assembly can then be easily withdrawn from the work opening 12. It will be seen that in the latter event, all of the parts of the assembly may be reused again for remounting a molding on the support panel.

From the foregoing description and accompanying drawings it will be seen that the invention provides a novel and inexpensive fastener and sealing assembly for detachable mounting on a supporting panel, for effectively sealing a work opening in the supporting panel against the entry therethrough of water, dust, foreign matter and the like, and for economically and expeditiously mounting various sizes of trim-strip or molding on the supporting panel.

The terms and expressions which have been used are terms of description and not of limitation and there is no intention in the use of such terms and expressions of excluding any equivalents of the features shown and described or portions thereof, but it is recognized that various modifications are possible within the scope of the invention claimed.

I claim:

1. In combination, a malleable-like sheet metal clip comprising a generally planar base and a pair of spaced movable arms connected to said base intermediate the ends of said arms, said arms defining a pair of tabs projecting from one surface of said base and a pair of shank elements projecting from the opposite surface of said base, and a generally U-shaped detachable one-piece molding strip attaching member mounted on said clip, said member comprising a generally planar base portion having an opening therethrough, one surface of said base portion engaging said opposite surface of said base of said clip with said shank elements extending through said opening, the other surface of said base portion being adapted to engage a supporting part over a work opening therethrough with said shank elements being adapted to project through the work opening in the supporting part and being movable to secured position in the work opening responsive to movement of said tabs whereby said clip and said member will be mounted in secured relation on the supporting part with said base holding said member on the supporting part, and flange means on said member for attaching a molding strip having inturned flanges to the supporting part after securement of said clip and member assembly to the supporting part, said flange means projecting outwardly from said base portion in the general direction of projection of said tabs and to an extent greater than the extent of projection of said tabs.

2. In combination, a malleable-like sheet metal clip comprising a generally planar base and a pair of spaced movable arms connected to said base intermediate the ends of said arms and substantially in the plane of said base, said arms defining a pair of tabs projecting from one surface of said base and a pair of shank elements projecting from the opposite surface of said base, a one-piece generally U-shaped molding securing member detachably mounted on said clip, said member being formed from a strip of spring-like sheet metal and comprising a generally planar base portion having an opening therethrough, one surface of said base portion engaging said opposite surface of said base with said shank elements being received through said opening, said clip and member assembly being adapted to be positioned over a work opening in a supporting part with the other surface of said base portion engaging the supporting part and with said shank elements extending through said work opening, said shank elements being movable outwardly with respect to one another to generally permanently deformed positions and in secured position in the work opening responsive to inward movement with respect to one another of said tabs, whereby said shank portions are deformed into interlocking relationship with marginal portions of the work opening, and means comprising resilient flanges on opposite ends of said base portion of said member projecting obliquely outwardly in a direction away from said one surface of said base and adapted to extend outwardly from the supporting part, for attaching a molding strip having inturned flanges to said supporting part after securement of said clip and member assembly to the supporting part, said flanges extending outwardly from said base portion to an extent greater than the extent of projection of said tabs.

3. In combination, a malleable-like sheet metal clip adapted for mounting over a work opening in a supporting part and comprising a generally planar body and a pair of spaced movable arms integrally connected to said body intermediate the ends of said arms and substantially in the plane of said body, said arms defining a pair of shank elements projecting from one surface of said body and a pair of shank actuating tabs projecting from the opposite surface of said body, a deformable sealing element comprised of pliable material, such as rubber, detachably mounted on said clip, said sealing element comprising a hollow head portion and a flange extending generally radially outwardly from said head portion, said flange engaging said one surface of said body with said shank elements being received in said head portion to mount said sealing element in substantially undeformed condition on said clip, and a one-piece detachable, generally U-shaped molding securing sheet metal member mounted on said clip and sealing element, said member comprising a generally planar base portion having an opening therethrough through which extend said shank elements and said head portion of said sealing member with one surface of said base portion engaging said flange portion, and means on said base portion of said member for securing a molding having inturned flanges to the supporting part, said means comprising flange portions projecting outwardly from said base portion in the general direction of extension of said tabs and to an extent greater than the extent of projection of said tabs, said head portion and shank elements being adapted to project through a work opening in a supporting part with the other surface of said base portion engaging the supporting part to mount the clip, sealing element and member assembly on the supporting part, said shank elements being movable outwardly with respect to one another responsive to inward movement of said tabs with respect to one another whereby said shank elements will be substantially permanently deformed into interlocking relation with marginal portions of the work opening and said head portion will be deformed by said shank elements into sealing relation with the work opening after which the molding may be mounted in snap-fastening coaction with said means.

4. The combination in accordance with claim 3 wherein said head portion of said sealing element is of dome-like exterior configuration, said opening in said member being of circular configuration and receiving said head portion and associated shank elements of said clip therethrough in relatively snug relation to frictionally maintain said clip, sealing element and member in assembled condition.

5. In a fastening assembly comprising a supporting part, such as a panel, having a work opening therethrough, a malleable-like sheet metal securing clip mounted on said supporting part over said work opening and comprising a generally planar body and a pair of spaced movable arms integrally connected to said body intermediate the ends of said arms and substantially in the plane of said body, said arms defining a pair of tabs projecting from one surface of said body and a pair of shank elements projecting from the opposite surface of said body, said shank elements being of generally outwardly directed bent configuration, a deformable sealing element comprised of generally resilient material detachably mounted on said clip, said sealing element comprising a base in the form of a continuous flange portion disposed intermediate said body and one side of said supporting part and a generally hollow head portion projecting from said flange portion, said flange portion having an outer defining edge disposed in overlapping relation with the defining edge of said work opening, said head portion defining a cavity therein in which said shank elements are received to mount said sealing element on said clip with said head portion and associated shank elements extending through said work opening, and a one-piece generally U-shaped molding securing member detachably mounted on said clip and sealing element assembly, said molding securing member being formed of sheet metal and comprising a generally planar base portion having an aperture therethrough, said head portion of said sealing element and said shank elements extending through said aperture with said flange engaging one surface of said base portion, the other surface of said base portion of said molding securing member being in abutting relation to said one side of said supporting part, said shank elements being moved outwardly to generally permanently deformed positions and in secured relation in the work opening in response to inward movement of said tabs to generally permanently deformed positions, said shank portions upon said movement thereof deforming said head portion of said sealing element against defining surface portions of said work opening and clamping sections of said head portion between said shank elements and the other side of the supporting part and in engaged relation therewith to close the work opening against the passage of foreign matter in the secured position of said shank elements, and means on said base portion for securing a molding strip having inturned flanges to the supporting part after securement of said clip, sealing element and member assembly to the supporting part, said means comprising resilient flanges on opposite ends of said base portion projecting obliquely outwardly therefrom in the general direction of extension of said tabs and to an extent greater than the extent of projection of said tabs.

6. The combination in accordance with claim 5 wherein said tabs are disposed in planes extending generally transverse to the planes of said flanges.

References Cited in the file of this patent

UNITED STATES PATENTS

| 2,306,460 | Meyer et al. | Dec. 29, 1942 |
| 2,513,105 | Poupitch | June 27, 1950 |
| 2,618,193 | Peckham | Nov. 18, 1952 |
| 2,671,254 | Meyer | Mar. 9, 1954 |
| 2,846,743 | Patton | Aug. 12, 1958 |
| 2,885,041 | Tower | May 5, 1959 |
| 2,924,864 | Holton | Feb. 16, 1960 |

FOREIGN PATENTS

| 792,444 | Great Britain | Mar. 26, 1958 |